United States Patent [19]

Blanpain et al.

[11] Patent Number: 5,543,714
[45] Date of Patent: Aug. 6, 1996

[54] THREE DIMENSIONAL MAGNETIC MAPPING PROCESS AND APPARATUS WITH DATA FILTERING USING AN INVERSE COMPUTATION

[75] Inventors: Roland Blanpain, Entre Deux Guiers; Bruno Flament, Grenoble, both of France

[73] Assignee: Commissariat A L'Energie Atomique, Paris, France

[21] Appl. No.: 161,472

[22] Filed: Dec. 6, 1993

[30] Foreign Application Priority Data

Dec. 14, 1992 [FR] France .................................. 92 15042

[51] Int. Cl.$^6$ ..................................................... G01V 3/08
[52] U.S. Cl. ........................ 324/345; 324/323; 324/365; 364/420
[58] Field of Search ..................................... 326/331, 345, 326/244, 245, 323, 334, 357, 365; 364/420, 724.01, 724.02

[56] References Cited

U.S. PATENT DOCUMENTS

| | | | |
|---|---|---|---|
| 4,068,160 | 1/1978 | Hunt | 324/323 |
| 4,617,518 | 10/1986 | Srnka | 324/365 |
| 5,030,913 | 7/1991 | Byram | 324/345 |

FOREIGN PATENT DOCUMENTS

| | | |
|---|---|---|
| 0474229 | 11/1992 | European Pat. Off. . |
| 2555322 | 11/1984 | France . |

OTHER PUBLICATIONS

"Report of Workshop on the Geoelectric and Geomagnetic Environment of Continental Margins", Steering Committee Report, A. D. Chave et al., Prepared for the Office of Naval Research under Contract NO0014-89-J-3064, Apr. 1990.
*Geophysics*, "Calculation of the Magnetic Gradient Tensor from Total Field Gradient Measurements and its Application to Geophysical Interpretation", J. Nelson, vol. 53, No. 7, Jul. 1988, pp. 957–966.
*Geophysics*, "Magnetic Upward Continuation from an Uneven Track", R. Parker et al., Vol. 37, No. 4, Aug. 1972, pp. 662–668.
*Journal of Geophysical Research*, "Spectral Interpolation and Downward Continuation of Marine Magnetic Anomaly Data", D. Caress et al., vol. 94, No. B12, pp. 17,393–17,407.
*Method of Geochemistry and Geophysics*, 19, "Advanced Theory of Deep Geomagnetic Sounding", Chapter 6, M. Berdichevsky, 1984, pp. 135–141.
"Soustraction de bruit, Analyse et Synthese Bibliographique", D. Baudois, et al., Traitement du Signal, vol. 6, No. 5, 1989.
*Tectonophysics*, "3–D Inversion of Deep Tow Magnetic Data on the Atlantis II Deep (Red Sea): Hydrothermal and Geodryamic Interpretation", M. Ie Quentrec, et al., vol. 198, 1991, pp. 421–439.
*Geophysics*, "The Validity of the Geological Interpretations of Marine, Magnetic Anomalies", 1977, University of California, San Diego Marine Physical Laboratory, S. Miller.

(List continued on next page.)

Primary Examiner—Sandra L. O'Shea
Assistant Examiner—Jay M. Patidar
Attorney, Agent, or Firm—Burns, Doane, Swecker & Mathis

[57] ABSTRACT

In a magnetic cartography process and apparatus, measurements are performed by magnetic field sensors placed in "fish" moved in the area to be mapped. Gradients are determined on the basis of the difference between the measurements supplied by two sensors at the same time, this applying to any pair of sensors, and/or on the basis of the difference between the measurements supplied by the same sensor at two different times, this applying to any sensor, which leads to at least one map of gradients which is broken down into a map of regional field gradients and a map of local field gradients. On the basis of the local field gradients, a determination takes place of the geological field relative to the area, or the gradients of the field and then the local field, by adding the geological field to the regional field determined on the basis of its gradients by an inversion and direct calculation method.

30 Claims, 4 Drawing Sheets

OTHER PUBLICATIONS

*Geophysics,* "An Attempt to Formulate Well–Posed Questions in Gravity: Application of Linear Inverse Techniques to Mining Exploration", V. Richard et al., vol. 49, No. 10, Oct. 1984, pp. 1781–1793.

"Integral Transform in Geophysics", Integral Techniques for Analytical Continuation of Three–Dimensional Laplace Fields, Zhdanov, M., 1984, pp. 195–199.

"Interpretation Theory in Applied Geophysics", F. S. Grant, et al., MacGraw Hill Book Comany, 1965.

"Geomagnetism", J. A. Jacobs (Ed.), Edited by J. A. Jacobs, Academic Press, 1989.

International Geomagentic Reference Field 1991, R. A. Langel, Revision, Geophysics, vol. 57, No. 7, Jul. 1992.

"Inverse Problem Theory, Methods for Data Fitting and Model Parameter Estimation", A. Tarantola, Elservier Science Publishers B. V., 1988.

"Traitement en temps réel du signal issu d'une sonde magnétométrique pour la détection d'anomalis magnétiques", R. Blanpain, INPG Thesis, 1979.

Thyssen–Bornemisza, S., "Magnetic Surveying Using Horizontal Gradient Vectors" pp. 1262–1264, 1977, *Geophysics,* vol. 42, No. 4.

Beamish, D. et al., "Difficulties in the Application of Magnetic Field Gradient Analysis to Induction Studies" pp. 1–13, 1982, *Physics of the Earth and Pleanetary Interiors,* vol. 28.

Marcotte, D. L. et al., "Automated Interpretation of Horizontal Magnetic Gradient Profile Data" pp. 288–295, 1992, *Geophysics,* vol. 57, No. 2.

Dieny, B. et al., "Giant Magnetoresistance in Soft Ferromagnetic Multilayers" pp. 1297–1300, 1991, *Physical Review B: Condensed Matter,* vol. 43 No. 1.

Nguyen–Van–Dau, F. et al., "Recent Advances in Molecular Beam Epitaxy of Metallic Multilayers and Superlattices" pp. 971–976, 1990, *Revue De Physique Appliquee,* vol. 25 No. 10.

"3D Magnetic Mapping System and Process Tool for a MAD Buoy Network", Bruno Flament, et al., LETI (CEA–Technologies Avancees), pp. 1–6.

THREE DIMENSIONAL MAGNETIC MAPPING PROCESS AND APPARATUS WITH DATA FILTERING USING AN INVERSE COMPUTATION

FIELD OF THE INVENTION

The present invention relates to a magnetic cartography or mapping process and to an apparatus making it possible to perform said process.

The term "cartography" is understood to mean producing a map of the magnetic field at any point in an area, said area being two or three-dimensional.

The invention more particularly applies to:

producing magnetic maps of marine, coastal or land areas, the detection of pipelines, wrecks, cables or other submerged objects, the exploration of archeological sites, geological studies of submerged or land areas (e.g. for prospecting) and the reduction of the geological noise on mobile magnetometer networks.

BACKGROUND

The production of magnetic maps is made difficult by background noise which systematically accompanies the measurements.

One of the difficulties consists of overcoming geomagnetic interference, particularly during periods of major magnetic activity, and possible biases of the magnetic field measurement system used. In addition, the prediction of the field is an extremely noise-sensitive operation at points located between the available measurement volume and the geological structure.

The process and apparatus according to the invention make it possible to produce very accurate maps of the magnetic field or its gradients by reducing the contribution of interference due to geomagnetic noise without having to use reference measurements for said noise (in certain particular operation modes of the invention, the accuracy is better than 1 nT and can even reach 0.1 nT, whereas in the prior art the accuracy obtained is a few nT), and the calculation of a prediction of the magnetic field or its gradients everywhere in space.

Hereinafter definitions will be given of fields of which it is wished to obtain a map and interfering fields which systematically falsify the measurements. It is also considered hereinafter that the magnetic data are obtained with field module measurement magnetometers, which at present constitute the most efficient land systems (the term "sensor" is understood to mean a probe and its associated electronics, whilst "magnetometer" is understood to mean such a sensor and a frequency meter). In the general case, other magnetometers can be used.

With the aid of this equipment and under the most general environmental conditions, the process according to the invention is of an optimum nature for obtaining readings of a geological field.

The signal measured by a magnetometer designated by its reference i and moved over the study zone or possibly fixed to the land, can be modelled with the necessary accuracy for the invention by:

$$s_i(r_i(t)) = b_{geol}(r_i(t)) + b_{gmag}(r_i(t), t) + br_{an}(i, I_i, D_i, t)$$

In this formula, i is the index of the magnetometer (the position of the probe of the magnetometer i at a given time t is designated $r_i(t)$) and $s_i$ is called the "earth field".

This earth field is the superimposing of all the magnetic phenomena listed hereinafter:

$b_{geol}$ is the "geological field" dependent on space and not the time t, the present invention making it possible to produce the map thereof, $b_{gmag}$ is the "magnetic field" also called geomagnetic noise or geomagnetic fluctuations and which is assumed to be dependent on space and time, and $br_{an}$ is the noise due to the measurement system and detected by the probe i, or anisotropy noise, dependent on its direct environment (the anisotropy produced by the magnetic effects of the measurement system in exemplified manner) and its orientation in the earth field, measured by its inclination $I_i$ and is declination $D_i$.

The magnetic sources entering the composition of the earth field can roughly be classified in accordance with their external or internal origin (cf. the document (JACOBS 89) which, like the other documents referred to hereinafter, are listed at the end of the present description).

The external part of the earth field is very weak and thus most of the earth field is due to internal sources constituting the geological field. The latter is virtually totally (approximately 99%) formed by the amplitude of the earth field.

It can itself be broken down into a Gaussian field equal to approximately 95% of the earth field, which has a deep origin, and an "anomaly" field produced by magnetized rocks of the earth's crust and the upper mantle or any magnetic source of a random nature, referred to as the local magnetic source.

The anomaly field (compared with the Gaussian field) has an amplitude of approximately 1 to 100 nT. The earth field is several dozen nanoTesla.

The external part is variable in time and constitutes the source of the geomagnetic noise (which results from a charged particle flux, which is variable as a function of time and produced by the sun). Its fluctuations have amplitudes of 1 to a few dozen nT. The noise $br_{an}$ is the measurement noise due to the actual measurement system.

It is mainly formed from anisotropy noise dependent on the orientation of the sensors and whose amplitude is a function of the quality of the measurement system and the sensors used. Consequently the anisotropy signal recovered by a sensor following a constant course is a constant signal.

The noise $br_{an}$ generally has to be taken into account for the optimum calculation of the maps and predictions.

The invention aims at determining the geological field, whose measurement is systematically disturbed by the geomagnetic noise and the anisotropy noise. Hereinafter consideration is given to the geological anomaly field.

Under the action of a magnetic field, minerals can acquire an induced magnetization directed in accordance with the exciting field (paramagnetic materials) or the opposite direction (diamagnetic materials). They can also retain a residual magnetization, due to the excitation after the latter has disappeared or has been modified (ferromagnetic materials).

Magnetized rocks responsible for field anomalies belong to the surface layer of the Earth or earth's crust.

Remanence can only occur for temperatures below the Curie point. For an average temperature increase of 20° C. per km, said temperature is reached before the first 100 km.

For the non-geologist, the rocks of the earth's crust are therefore magnetized elements, whose magnetization has a random direction and intensity. The magnetism of rocks is dealt with in the JACOBS 89 document.

The behaviour of the geomagnetic field will be considered hereinafter. The origin of the geomagnetic field is outside the Earth. It is due to solar activity and to movements of charged particles generated by the sun around the Earth. One of its properties is its space coherence.

The physical analysis of phenomena involved shows that geomagnetic pulsations can be predicted with the aid of linear filters $F_u$ and $F_v$, cf. the BERDICHEVSKI 84 document. These linear filters $F_u$ and $F_v$ are variable in space, as can be seen in FIG. 1, which shows a plan view of the area 2 to be mapped (measurement of the magnetic field b) at sea (reference 4) and which also shows land references (the land carrying the reference 6).

It is also possible to see two directional magnetometers 8 in directions u and v.

An optimum prediction filter is constituted by filters Fu and Fv applicable to the signals of said directional magnetometers and dependent on the coordinates of the measurement point, but independent of time.

FIG. 1 shows a space prediction performed with the aid of two independent measurements (two components of the field) performed on land, whereas the prediction point is at sea. An optimum filter has at the most two dimensions.

As input channels it must have two independent field components for supplying an estimate on the geomagnetic noise measured at sea. The land measurement must be of a vectorial nature and have an accuracy at least equal to that of the measurements performed on the area to be mapped. The measurement can also be scalar and the filter obtained is then only of an optimum nature in certain special cases.

In conclusion, the magnetic anomalies on areas of a few hundred km$^2$, due to the geology and local magnetic sources, constitute a space variable field superimposed on the Gaussian field, whose measurement is made noisy by the geomagnetic pulsations.

The magnetic anomalies are produced by the magnetized rocks of the earth's crust and the upper mantle thereof.

Geological events, such as reliefs or contours, are added to the magnetic properties of the rocks in order to contribute to the local anomalies of the geological field.

A description will be given hereinafter of known processes for producing and extending a magnetic map.

The measurement of the geological field of which it is desired to obtain the map is accompanied by the recording of the geomagnetic noise and the noise of the measurement system. Therefore the production of highly accurate magnetic maps must obtain freedom from such noise and in particular the geomagnetic noise.

The simplest method consists of not carrying out filtering and of using noisy measurements of the earth's field directly prior to interpolation. This leads to measurements of the geological field, whose error is of the same order of magnitude as the geomagnetic noise during the measurement (generally 1 to 10 nT).

When a geomagnetic noise reference is available, it is possible to obtain filtering by subtraction of the signal of said reference from the measurement of the earth's field. This presupposes that the transfer functions between the noise references and the geomagnetic noise on the area are unitary.

If the area to be mapped is remote from the references, the difference can have a significant geomagnetic noise residue. The signal to noise ratio of the maps produced in this way is low.

The present invention makes it possible to obviate the need for land references and to obtain maps which are virtually free from geomagnetic noise.

A high performance 2D (i.e. two-dimensional) filtering method for the measurements is given in the CARESS 89 document.

The earth's field data are passed into a 2D filter defined in the spectral range and constant over the entire mapped area. It is therefore necessary to have an anomaly field, whose properties are stationary over said area.

This approach makes it possible to carry out a 2D filtering of the measurements, take account of non-isotropic properties of the field lines and respect Laplace's equation of the potential fields. However, filtering is not of an optimum nature in areas where the field is not stationary in space.

The process according to the invention makes it possible to carry out an adaptive filtering according to the location of the measurement and take account of the non-stationary nature of the properties of the geological field, whilst also respecting Laplace's equation.

With regards to the analytical extension of a field, the tool for extending field maps has its origin in the analytical extension of complex functions (cf. the ZDHANOV 84 document). On the basis of these mathematical foundations, Zdhanov demonstrates all the theorems useful to the geophysicist for the manipulation of the fields.

The potential field extension relations are also e.g. demonstrated in the GRANT 65 document. These relations clearly show the upward extension effects (i.e. in the direction opposite to the sources), which attenuates the highest space frequencies.

This extension is used for smoothing the appearance of the magnetic maps, because it eliminates local shapes, which are of no use in the overall or regional understanding of an area.

The downward extension relation simply reveals the stability problems of the extension of a field in the direction of the sources giving rise to it. The extension downwards amplifies the shortest wavelengths by a factor proportional to $\exp(|k|Dz)$, in which k is the space frequency of the geological field and Dz the extension distance.

The upward and downward extension relations exist and are mathematically established for exact and continuous data. The downward extension is a problem where small input data errors can give rise to significant errors with respect to the estimates.

The experimental measurement data of the geological field available are subject to errors and are in finite number. It is therefore necessary to use regularizing methods in order to ensure a good validity of the downward extensions.

The above paragraphs demonstrate the difficulty of the downward extension operation. The putting into practice of the extension consequently requires particular care, when there are real, i.e. inaccurate, noisy and non-continuous measurements.

A practical validity study was carried out by Miller (cf. the MILLER 77 document) by comparing readings taken on the surface with direct measurements performed on the ocean bed and extended upwards. The results of his study are based on a frequency study of the measured surface profiles and those of the measured bed and which have been extended upwards and demonstrate that for short wavelengths, the surface readings are not coherent with those of the bed. Therefore the surface and bed informations are not of the same origin for these wavelengths.

Under the measurement conditions concerning the studied information, Miller shows that the readings taken on the bed are only slightly contaminated by noise (positioning error, parasitic movements of the measurement "fish", magnetism of the towing boat, geomagnetic noise) and can consequently be used here as a reference.

Thus, the validity of extended profiles is crucially dependent on this preliminary treatment or processing, whose parameters are difficult to estimate. The earth field data must be filtered in an optimum manner prior to extension.

The proposed pre-extension filtering is generally a contrivance which is not linked with the real physical properties of the anomaly field and which is intended to make it sufficiently smooth (i.e. attenuate the shortest wavelengths) in order to compensate the amplification of the term in exponential form referred to hereinbefore. This filter, recommended in the Grant 65 document, can eliminate the measurement noise, but can also deteriorate the signal of the geological field.

Finally, it is difficult to give a perfect cut-off frequency, i.e. regulate the regularization parameter of the extension and the results of the extensions obtained in this way cannot show the fine details.

This pre-filtering method is difficult to perform and not particularly well adapted to magnetic maps for variable beds for which the filtering would have to be adapted to the distance of the closest sources.

Caress and Parker disclose a method for the interpolation and extension of the field map of marine magnetic anomalies (cf. CARESS 89), pointing out that the aforementioned methods, whilst covering smooth interpolation methods, do not respect the marked anisotropy of the treated magnetic maps.

Their anomaly model is a stochastic procedure with stationary properties over the entire magnetic map characterized by a constant 2D spectrum. The constraints of an anomaly field also makes it necessary for them to obey the Laplace's equation and this is integrated in the model. The algorithm provided has the advantage of supplying the uncertainty associated with the interpolated value. The latter treatment method for the marine magnetic readings is of a high performance type for stationary property anomalies. The model is anisotropic and also respects the nature of the potential field.

However, the readings used for producing the prediction of the geological field cannot always constitute maps with stationary properties. In certain difficult and coastal areas (cf. the CHAVE 90 document), the ocean beds can vary between a few dozen and several thousand meters. The geological field cannot then be considered as stationary. The geomagnetic noise, with the present variations of several dozen nT, then constitutes a very serious disturbance.

In conclusion, the quality of the predictions of the determination of the geological field by optimum extension methods is crucially dependent on the quality of the starting map.

The present invention proposes a non-spatially stationary filtering process which respects Laplace's equation.

In addition, the use of the apparatus according to the invention leads to freedom from the geomagnetic noise and/or the anisotropy noise.

Consideration will now be given to the inverse geophysical problems. Geophysicists use inverse methods for the determination of certain parameters of the subsoil on the basis of measurements performed on the surface.

These inverse methods are used in gravimetry (cf. the RICHARD 84 document) and in geomagnetism (cf. e.g. the LE QUENTREC 91 document). The calculations performed aim at giving information on the subsoil.

The parameters of the subsoil found by inversion (cf. TARANTOLA 87) have the property of the "at best" generation of the measured data. Thus, inverse methods make it possible to find a physical subsoil model making it possible to re-create the measurements.

The geophysicist is interested in interpreting the parameters of the subsoil found by inversion. However, in potential field inversion problems the solution is not unique. The problem is fundamentally underdetermined. For continuous data without noise, it is impossible to find the real solution. Under these conditions, it is known to use filtered or unfiltered field measurements. From then is initially subtracted a regional field component not generated by the local geology.

The remaining anomaly data are due to local properties, which alone interest the geophysicist. These data are then inverted on a prior unknown magnetization distribution. The values of the parameters found make it possible to obtain information on the subsoil.

It is known that when two potential fields coincide on the same surface, they coincide everywhere (cf. the ZDHANOV 84 document).

This invention makes use of the said theorem for carrying out field extensions with the aid of the parameters of a subsoil model, determined by known inverse methods (cf. the TARANTOLA 87 document).

The present invention proposes rules for producing a model adapted to the extensions.

SUMMARY OF THE INVENTION

The present invention aims at a process and an apparatus making it possible to produce maps of the geological field, with an accuracy superior to the known processes and predict the geological field at any point in space.

In particular, the process according to the invention makes it possible to obtain freedom from the geomagnetic noise interfering with the magnetic measurements. This process also carries out an optimum filtering of the measurements, which can be distributed at random points.

The geological field calculated according to the invention respect Laplace's equation of potential fields.

More specifically, the present invention firstly relates to a process for producing a map of the geological field of any point of an area, said process being characterized in that it comprises the following stages:

the magnetic field sensors are moved over the area to be mapped, in accordance with predetermined trajectories, said sensors supplying measurements of the earth magnetic field, preprocessing takes place of data constituted by these earth magnetic field measurements and by the positions of the sensors in time, said preprocessing comprising the elimination of false measurements and the time low-pass filtering of the data, determination takes place of at least one of the two groups constituted by a group of first gradients or measured gradients, said first gradients being obtained from the difference between two earth magnetic field measurements preprocessed in this way, corresponding to two different sensors and at the same time, for all or part of the group formed by all the possible pairs of sensors and at any time, a group of second gradients or calculated gradients, said second gradients being obtained from the difference between two earth magnetic field measurements preprocessed in this way, corresponding to the same sensor and to two different times and this applies for all or part of the group of sensors and for each time, from which at least one gradient map is obtained, each gradient map obtained is broken down into a local field gradient map, said local field being due to the anomaly field of the area to be mapped, and a regional field gradient map, the measured geological field being the sum of the local field and the regional field, a magnetization distribution model of the subsoil of the area to be mapped is chosen and said magnetization distribution is calculated by inversion, on the basis of the local field gradient maps and, with the aid of said distribution, a determination takes place of the anomaly field of the area to be mapped and/or the gradients of said anomaly field, in the form of the field or the gradients of this field or both, and determination takes place of at least one of the two maps constituted by a geological field map, which is determined by the addition of the corresponding field to the anomaly field and the regional field, the latter being previously determined on the basis of the regional field gradient map and a geological field gradient map, which is determined by the addition of the gradients of the anomaly field and the gradients of the regional field.

According to an advantageous embodiment making it possible to improve the smoothing of the measurement curves, the variation between said two different times is approximately equal to half the water depth divided by the speed of the boat, in the case of mapping a marine area.

According to a special embodiment of the process according to the invention, the data obtained by the preprocessing stage are in the form of a group of files, each file corresponding to a given course profile and containing the field measurement and the position of the probe of each sensor at the time of the corresponding measurement.

Preferably, in the best possible way elimination takes place of the geomagnetic noise of the earth field measurements used for determining said calculated gradients, prior to said use. This makes it possible to improve the quality of the differences, which are then calculated in order to obtain these gradients.

The inversion used for the calculation of the magnetization distribution can be a stochastic inversion, which is very suitable for the present invention.

The chosen magnetization distribution can be of the dipole type, all the magnetic dipoles being located in the subsoil and said dipole distribution extends over an area including that to be mapped.

In this case, according to a preferred embodiment of the process according to the invention, by choosing as the regional field a field whose curve of the variations as a function of the horizontal space coordinates adopts the shape of a ramp, the maximum depth of the distribution of dipoles is equal to 1/10 of the maximum dimensions of the map to be produced, the distance between the dipoles located at a given depth is at the most equal to half said given depth, and the dipoles are distributed in layers of increasing depths, each layer being located at a depth at the most equal to five times the depth of the preceding layer.

The present invention also relates to an apparatus for producing a geological field map of an area, characterized in that it comprises a group of magnetic field sensors and means for the simultaneous displacement of said sensors over an area to be mapped, the positions of the probes of the sensors as a function of time being known, the clearance between the probes being chosen in such a way as not to deteriorate the information obtained by subtraction of the signal supplied by the sensors during the production of the gradients.

Preferably, the clearance between the probes displaced in a horizontal plane at a distance h from the local magnetic sources, is at the most equal to the smallest of the two values constituted by the distance h and the maximum spacing of the probes making it possible for them to have the same electrical conductivity environment for a given accuracy.

The map according to the invention can be reduced to one or a few points and the geological field is then determined at said point or points.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENT

Figure 1:
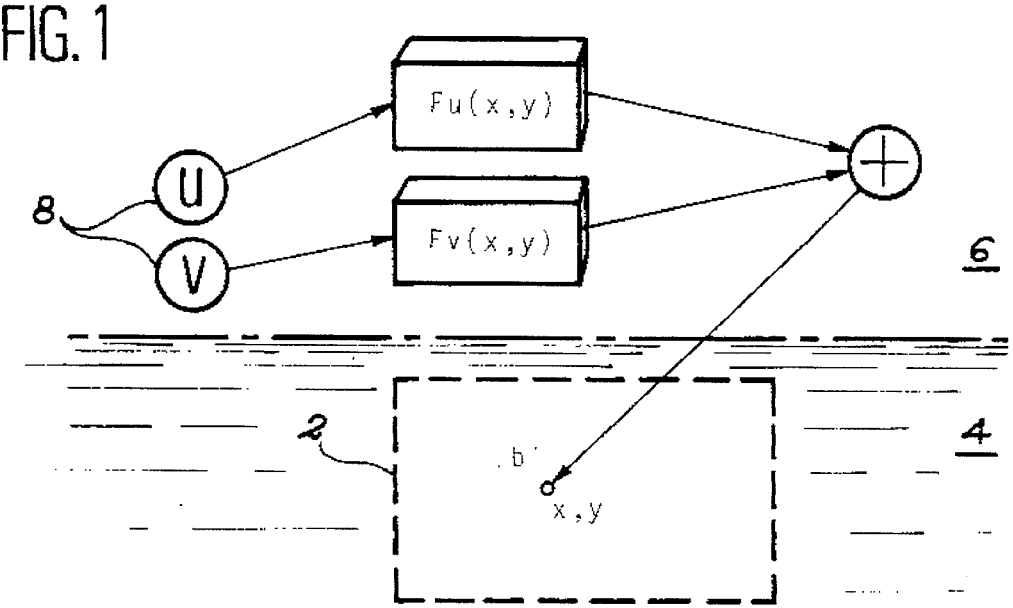
FIG. 1, already described, a diagrammatic plan view of a marine area to be mapped and the land references.

Significant accuracy constraints with regards to the reconstructed magnetic field and a limited signal to noise ratio for the measurements are disadvantageous in the prior art geological field map production methods.

The present invention makes it possible to calculate the field with an accuracy better than the known processes and apparatuses, no matter what the measurement conditions.

It is possible here to reduce the interference and disturbances due to geomagnetic noise in a quasi-perfect manner as a result of the acquisition method used in the invention. The filtering method used by the invention makes it possible to take into account all data types (field or its gradients) and performs a 3D (three-dimensional) filtering, of a non-spatially stationary nature and respecting Laplace's equation.

The measuring apparatus according to the invention will now be considered. Use is made of the model referred to hereinbefore, where the earth field measurements carried out by a sensor are made noisy by geomagnetic fluctuations and an anisotropy noise. The geomagnetic noise is dependent on the conductivity of the environment of the sensors.

For sensors placed under conditions such that their relative environments are identical, the geomagnetic noise is duplicated between individual sensors. For the elimination of the noise, differences are then formed between signals of sensors which are sufficiently close together for them to measure the geomagnetic noise under the same conditions.

This leads to a quasi-perfect reduction of the geomagnetic noise by forming "gradients" $g_{ij}$ such that:

$$g_{ij}\left(\frac{r_j(t)+r_i(t)}{2}\right) \cdot \|r_j(t)-r_i(t)\| = s_i(t) - s_j(t) =$$

$$b_{geol}(r_i(t)) + b_{gmag}(r_i(t),t) + br_{an}(i,I_i,D_i) -$$

$$b_{geol}(r_j(t)) - b_{gmag}(r_j(t),t) - br_{an}(j,I_j,D_j)$$

By linguistic abuse the term $g_{ij}$ is said to be a measured gradient, whereas in actual fact it is only an approximation thereof. It should be noted that $r_i$ and $r_j$ are vectors, whose respective ends are the probes i and j. Thus, $\|r_j(t)-r_i(t)\|$ represents the distance between these probes i and j.

As these probes i and j are relatively close together, $\|r_j(t)-r_i(t)\|$ is small and the environments seen by these probes i and j carried by "fish" (using the example of the mapping of a water-covered area, such as a marine area) are identical and it can be considered that $b_{gmag}$ is "recopied" from one probe to the next.

A noise residue remains due to the anisotropy of the measurement system and the noise of the sensors, which is corrected best if there is a large distance between them.

For constant inter-probe distances, $g_{ij}(0.5(r_i+r_j))$ does not differ much from:

$$\text{grad}_{geol}\left(\frac{r_j+r_i}{2}\right) + \frac{br_{an}(i,I_i,D_i) - br_{an}(j,I_j,D_j)}{\|r_j-r_i\|}$$

in which $\text{grad}_{geol}$ is the true difference between the two geological fields at the "points" $r_i$ and $r_j$ (or more precisely at the ends of $r_i$ and $r_j$).

Apart from the noise inherent in the sensors, the noise term is a constant continuous component for a given pair of sensors and is constant. Thus, there are field differences, without geomagnetic noise and with the desired accuracy.

The measured gradients are obtained by the difference of measurements performed at the same time, between different sensors and positioned in accordance with the aforementioned rules. These gradients are free from geomagnetic noise and have the desired accuracy.

For performing the process according to the invention, it is possible to have a stage of calculating gradients (referred to as "calculated gradients" or "long base gradients", once again by abuse of language) with the aid of the signals of a single magnetometer. This stage is intended to form or enrich the gradient base available for the following stages. It is therefore optional if sufficient measured gradients are available.

The long base gradients are calculated with the aid of a single magnetometer by forming the difference of the measurements carried out successive points of a profile having a constant course.

The problems due to the anisotropy of the measuring system are cancelled out, because this signal is a continuous component individual to each magnetometer and to its orientation in the earth magnetic field.

The geomagnetic noise must be estimated on the basis of references on land in order to permit the best possible geomagnetic noise reduction. The long base gradients are an estimate of the real gradient, to within the geomagnetic noise reduction errors.

The signals obtained on the seine magnetometer i at two different times t and t+T are:

$$s_i(r_i(t))=b_{geol}(r_i(t))+b_{gmag}(r_i(t),t)+br_{an}(i,I_i,D_i) \quad s_i(r_i(t+T))=b_{geol}(r_i(t+T))+b_{gmag}(r_i(t+T),t+T)+br_{an}(i,I_i,D_i)$$

The long base gradient is obtained by the difference between these values from which is subtracted (if available) an estimate $B_{gmag}$ of the geomagnetic noise $b_{gmag}$:

$$gbl_i\left(\frac{r_i(t+T)+r_i(t)}{2}\right) \cdot \|r_i(t+T)-r_i(t)\| =$$

$$s_i(t+T) - s_i(t) + B_{gmag}(r_i(t),t) - B_{gmag}(r_i(t+T),t+T)$$

i.e.:

$$gbl_i\left(\frac{r_i(t+T)+r_i(t)}{2}\right) =$$

$$\frac{s_i(t+T) - s_i(t) + B_{gmag}(r_i(t),t) - B_{gmag}(r_i(t+T),t+T)}{\|r_i(t+T)-r_i(t)\|}$$

This expression can be written as a function of the real geological gradient:

$$gbl_i\left(\frac{r_i(t+T)+r_i(t)}{2}\right) = \text{grad}_{geol}\left(\frac{r_i(t+T)+r_i(t)}{2}\right) +$$

$$\frac{E_{bgmag}(r_i(t),t) - E_{bgmag}(r_i(t+T),t+T)}{\|r_i(t+T)-r_i(t)\|} \quad \text{with}$$

$$E_{bgmag}(r_i(t),t) = B_{gmag}(r_i(t),t) - b_{mag}(r_i(t),t)$$

and in which $\text{grad}_{geol}$ is the difference between the two geological fields at the points $r_i(t+T)$ and $r_i(t)$, divided by $\|r_i(t+T)-r_i(t)\|$.

This stage makes it possible to obtain regulatable base gradients, which are therefore adaptable both to the depth of the water using the example of mapping a water-covered area such as a marine area, and to the desired output quality, whilst not having anisotropy noise, if the course of the boat is identical at times t and t+T.

The measuring apparatus used in the invention makes it possible to produce a plurality of magnetic field profiles in simultaneous manner so as to obtain measured field gradients.

For this purpose it comprises a plurality of magnetic field sensors which are simultaneously displaced over the area, having the positions of their probes at all times. It is advantageously possible to use fixed magnetic sensors for producing a prediction filter and for performing the prefiltering of the measurements of the earth field. These fixed magnetic sensors are not indispensable, even if a high accuracy is required with respect to the final maps.

The method explained hereinafter requires the knowledge of the distance of the geological sources from the measurement points.

Thus, a water depth sensor may prove necessary, if the map of the depths is not known (when producing a map of a marine area).

The apparatus can be integral with a single moving object (e.g. a boat), each probe being positioned in active or passive manner. It is also possible to use a plurality of moving objects towing one or more sensors positioned in real time.

The inter-probe spacing is compatible with the properties of the space transfer functions of the geomagnetic signals, in such a way that for the spacings used, the probes see the same conductivity environment with the desired accuracy. This fixes an upper value $e_{max}^1$ for this spacing.

The apparatus able to perform the subtraction of the signals from the two magnetometers spaced by e and referred to as the clearance differentiator e and which is used here, must also not lead to any deterioration of the useful frequency band of the geological signal: if h is the lowest water level of the map then it is possible to consider that the maximum frequency of the anomaly field is 1/h (cf. the CHAVE 90 document).

The subtraction of a field x measured by two probes spaced by e, gives a field y linked with x by:

$$y(r-e/2)=x(r)-x(r-e)$$

The module of the transfer function corresponding to this subtraction is written:

$$|F(v)|=|Y(v)/X(v)|=(2(1-\cos 2pi.v.e))^{1/2}$$

which is cancelled out for $v_k=k/e$ (pi representing approximately 3.14).

Figure 2:
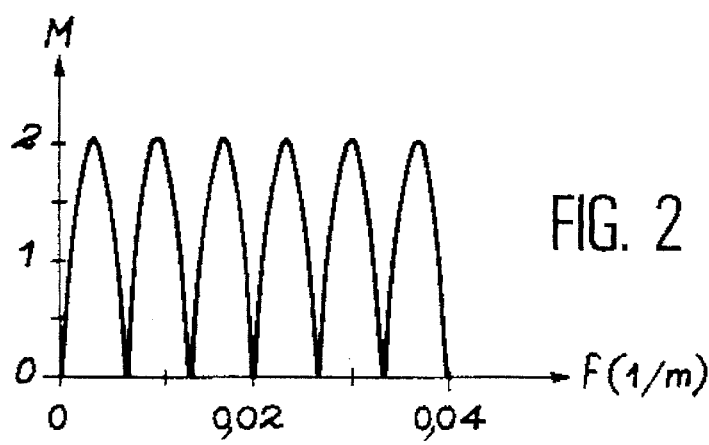
FIG. 2 Variations, as a function of the space frequency, of the module of a subtracting filter usable in the present invention.

Its frequency behaviour is consequently parametrized by e in accordance with FIG. 2, where it is possible to see the variations of the module M of said transfer function as a function of the space frequency f for e=150 m.

The first transmission zero of the filter is at $v_1=1/e$. In order to remain compatible with minimum h beds, it is necessary to have $1/e>1/h$ or: $e<h$, so as to finally give:

$$e_{max}=inf(h,e_{max}^1).$$

For minimum bed measurements of 100 m, the interprobe spacing must remain below min (100, $e_{max}^1$). In practice, when the sensors are in a similar relative environment, $e_{max}$ can be taken as equal to 50 m. The lower limit of this spacing is fixed by the accuracy of the magnetometers.

For a magnetometer accuracy of s pT and desired gradient measurements of accuracy q pT/m, a spacing e of the probes gives an estimate of the gradient of $2s/e<q$, i.e.: $e>2s/q$.

For measurements of gradients at e.g. pT/m and an accuracy of 10 pT for the magnetometers, $e_{min}=20$ m.

The measured and/or calculated gradient data must be in an adequate quantity and quality to permit an optimum reconstruction. The rule fixing the density of the data is based on Shannon's theorem. Thus, the inter-meshing must be adaptive according to the water depth or the distance of the magnetic sources. Consequently, for a bed of h, it is necessary to have a mesh of side dimensions equal to or less than h/2.

The fields must be acquired in such a way as to respect this mesh size on the acquisition plane.

Moreover, in order to make it possible to reduce the anisotropy effects, the courses followed by the measuring apparatus must remain constant on each profile produced.

The area in which the measurements are made must consequently be traversed by profiles which are as rectilinear as possible.

A description will now be given of a process according to the invention and the stages thereof will be referred to hereinafter.

The first operation is to acquire position and magnetic field measurements using a position and field measurement apparatus, after which said measurements undergo a preprocessing (reading the field and position signals, field-position synchronization, removing false measurements, correction of anisotropies, low-pass filtering and decimation).

This is followed by a stage of generating measured gradients or a stage of generating calculated gradients or both stages in parallel and as a result one or two groups of geological field gradients are obtained.

There is then a stage of eliminating the regional component on the basis of said group or groups, which in parallel makes it possible to produce one or more groups of gradients of the local field and one or more groups of gradients of the regional field.

As a result of an inversion and direct calculation stage, the group or groups of local field gradients make it possible to obtain one or more field and/or gradient filtered geological anomaly maps.

The group or groups of regional field gradients make it possible to obtain one or more regional field maps (by means of a prior stage of integrating the regional field gradients) and/or gradient maps of this field.

By an addition stage between the thus obtained maps for field or gradients in the same directions, this ultimately gives a map of the geological field and/or the gradients of this geological field.

Reference will now be made to the different stages of the process.

Preprocessing is indispensable for the quality and quantity of the data to be used by the remainder of the process. It comprises of the following operations:

Reading the unprocessed signals of the position and field measurements—synchronization.

Elimination of false measurements.

Correction of anisotropies, if anisotropy measurements are available. Low-pass filtering decimation of the data (the cut-off frequency of the filter used for this purpose is designed so as not to attenuate the useful space frequencies and must exceed 1/h), where h is the distance between the data and the magnetic sources).

For example, the end of preprocessing "unprocessed" data can be in the form of a group of files, each file corresponding to a given course profile and containing the values:

t, field (1,t), field (2,t), . . . field (N,t), position (1,t), position (2,t), . . . position (N,t) for N sensors 1, 2 . . . and at all times.

The object of the preprocessing is to make the measurements conform with the model of the signals referred to hereinbefore and relating to the earth field measured by a magnetometer.

The "measured gradients" are obtained by the difference between the signals from two different sensors and at the seine time, in accordance with the equations given hereinbefore. These difference data are free from geomagnetic noise at the desired accuracy. If they are present in a sufficient quantity, the "calculated gradients", whose generation is referred to hereinbefore, are unnecessary.

Use will be made of possible land references for filtering to the greatest possible extent the geomagnetic noise prior to the generation of the calculated gradients.

This filtering stage is optional and is only possible if there are land references and a land-sea predicting filter as described hereinbefore.

Hereinafter a description will be given of a process for obtaining said filter in the case where is not known. It is assumed as known a land-sea prediction filter for the entire area making it possible to estimate geomagnetic fluctuations on towed sensors.

Following preprocessing, said filter is applied to the reference signals in order to subtract said estimated signal from the recordings of the earth field measurements. The estimate of this filter can be obtained in different ways. Two methods based on experimental measurements will be given hereinafter.

The first method consists of producing a land-sea Wiener filter having one component and constant over the entire area. A simple suboptimum filter is obtained.

In accordance with the well known noise subtraction methods (cf. the BAUDOIS 89 document), to do this it is necessary to have a "primary channel" or noise only reference (in the present case these are land references) and a signal reference plus noise or "secondary channel" (these are signals of the towed fish). The estimate of such a filter can be improved in the a priori unfavourable case of broad band signals, if the useful signal has been subtracted from the secondary channel.

It is then advantageously possible to make use of the processing of the measured gradients described in the preceding section, free from geomagnetic noise, and which will make it possible to calculate, with the aid of the remainder of the process, a first estimate of the geological field map.

The suboptimum Wiener filter can then be estimated with, as the primary channel, the land references and, as the secondary channel, the geometric noise alone, which is estimated from the signals measured by the towed fish and, obtained by subtracting the estimated geological field from the earth field measurements.

The second method consists of having fixed geomagnetic noise recording points in the area.

There is then a group of Wiener filters estimated in accordance with conventional methods and each filter is then applied to the measurement profiles as a function of their positioning over the area. The differences between signals of the same sensor for different times are then calculated according to the formulas given hereinbefore.

Consideration will now be given to the stage of suppressing the regional field or gradient component. This stage is known to geophysicists (cf. the LE QUENTREC 91 document) as stated hereinbefore.

The method of predicting by inversion and then direct calculation explained hereinafter requires that the data are adapted to the model. This is the aim of the stage of suppressing the regional field or gradient component.

The magnetization model results from the unknown magnetization discretization distributed in the subsoil. This model cannot take into account the Gaussian field contained in the measurements and only considers the anomaly field.

Before continuing the processing, it is therefore necessary to subtract from the measured or calculated field or gradient an estimate of the so-called regional field, which is constituted by the slowest variations of the field as a function of space coordinates, which cannot be generated with the chosen model.

Figure 3:
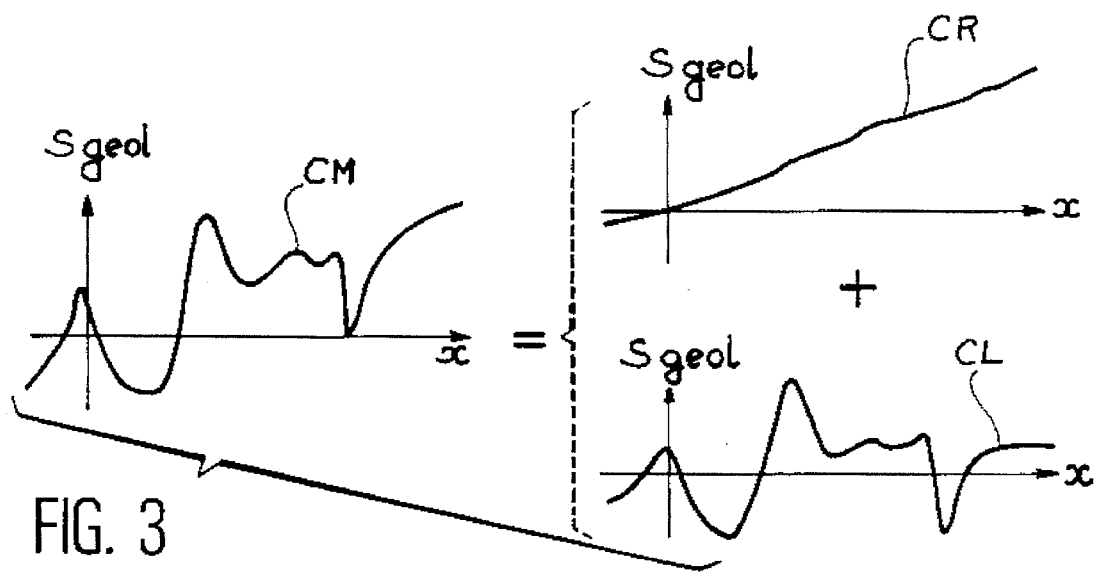
FIG. 3 Diagrammatically the subdivision of a magnetic field measurement into a local component and a regional component.

FIG. 3 diagrammatically illustrates the fact that the measured field CM is the sum of a regional field component CR and a local field component CL, inherent in the local magnetic sources and adapted to the model of the inversion (these fields being represented by the corresponding variations of the geological signal Sgeol as a function of the space coordinates x).

The field processed in the invention represents the anomaly field or "local" field, due to the geology of the first kilometers of the Earth and/or local magnetic sources.

The addition of the local field and the regional field gives the geological field whose map it is wished to obtain. The regional field can be estimated 2D low-pass filtering methods in space, interpolation method with strong smoothing, or calculated from models supplied by the International Geomagnetic Reference Field (cf. the LE QUNTREC 91 document). The regional field is then subtracted from the measured field and the residue can be processed.

To within a derivative the gradient data must be subject to the seine fate.

For dimensions of the areas to be mapped of a few hundred km², the regional field can be approached by an east-west and north-south linear function. Therefore the regional east and north gradients are constants, which only have to be subtracted from the initial data.

Estimates of these fields can be obtained by a mean calculation with respect to the measurements or data from the International Geomagnetic Reference Field (cf. the LANGEL 92 document), approaching the earth field by a sequence of spherical harmonics.

The following stage makes it possible to best utilize the measured or calculated gradient data for reconstructing the geological field and its gradients in space throughout.

Given the properties of the Laplace fields the following uniqueness theorem exists: if two fields coincide over a certain range, they are equal throughout (cf. the ZDHANOV 84 document).

It is now wished to find a magnetization distribution generating, to within the noise, fields equal to the measurements, so as to then be able to calculate the geological field everywhere in space using the said theorem.

It is possible to adopt a distribution model constituted by dipoles and the construction rules for such a distribution are given hereinafter.

The dipole signals are studied in the BLANPAIN 79 document.

It is also possible to have any other distribution making it possible to invert the data generated in the preceding stage.

The rules to be given resulted from the properties of the dipole signals making it possible to give sufficiently strong constraints for the model to be strictly obtained, so as not to deteriorate the information present in the measurements.

The distribution of the sources must respect the two rules 1) and 2) which have already been used (cf. e.g the LE QUENTREC 91 document):

1) All the dipoles must be in the subsoil.

2) The distribution must exceed the dimensions of the mapped area in order to avoid edge effects.

Rule 1) fixes an upper limit for the frequency occupation of the space-frequency plane for the anomaly field, in an automatic manner.

As a function of the location (x, y) on the map, the maximum possible frequency is that of the closest dipole (which is not necessarily that vertical of (x,y)). It is this arrangement which performs an adaptive filtering according to (x, y).

Rule 2) makes it possible to avoid excessive edge effects. This rule is vital for the interpretation of the distributions of the magnetizations obtained after inversion.

All that is required here is an empirical overlap or projection sufficient to avoid map edge deformations.

Moreover, in order to obtain the best possible representation, whilst limiting the total number of elements, the following rules 3) to 5) are respected in order to fix the distribution:

3) For a ramp-like regional field component and for a map of maximum dimension d, the maximum depth of the dipole distribution is taken as equal to d/10. This is because all the dipoles placed at the same depth have the same filtering power.

As a function of the frequency content of the local field remaining following the subtraction of the regional component, it is therefore necessary to place the layer of deepest dipoles at a depth $h_{max}$, so that the model can restore the lowest frequency necessary (equal to the highest frequency of the regional component).

For a ramp-like regional field component over a length d (i.e. a constant regional component for the gradients), which is adequate over the studied areas, the frequency content is cancelled out for $k_{max}=2/d$. It is therefore necessary that the deepest dipole layer is at a depth such that the minimum possible frequency is such that:

$$k_{min}<2/d \text{ and } k_{min}=1/(10h_{max}) \text{ hence } h_{max}>d/20$$

for a ramp-like regional field component.

In the case of dipole signals, rule 3) makes it possible to conclude that, with a ramp-like regional component and a safety factor, the depth of the most remote layer can be taken as equal to 1/10 of the length of the area to be measured.

4) The inter-dipole distance must be equal to or less than the depth divided by two. This rule solves the layer dipole density problem. It is based on the space dimensions of the anomaly created by a dipole at a depth h.

Indeed, for continuity reasons, the density of the distribution must be such that, for a layer at depth h, the inter-dipole distance $I_d$ must be sufficiently small for the said layer to create a no-zero anomaly over the entire map.

In the meshing of the space-frequency plane, the family of dipole functions must occupy the entire axis of the distances. It is necessary to have $0.58 \times h > I_d$ according to one of the space dimension criteria determined in the BLANPAIN 79 document.

In conclusion, on adopting a square mesh, the mesh side can be advantageously taken as equal to the depth of the layer divided by two.

5) If $h_c$ is the depth of the layer c, then the following layer must be at a depth equal to a maximum of $5h_c$. This rule gives the final parameter of the distribution, namely the number of layers or the inter-layer distance.

This distance must be such that the dipoles of two adjacent layers have contiguous spectral dimensions or slightly overlap. If this condition is not fulfilled, the model attenuates certain frequency bands corresponding to the missing layers. Let $h_c$ be the depth of a layer C and $h_{c+1}$ the depth of the following layer C+1.

In the dipole hypothesis, the spectrum of $h_c$ is cancelled out for $k_c^- = 1/10 \, h_c$ and that of the following layer commences at $k_{c+1}^+ = 1/2 h_{c+1}$.

Figure 4:
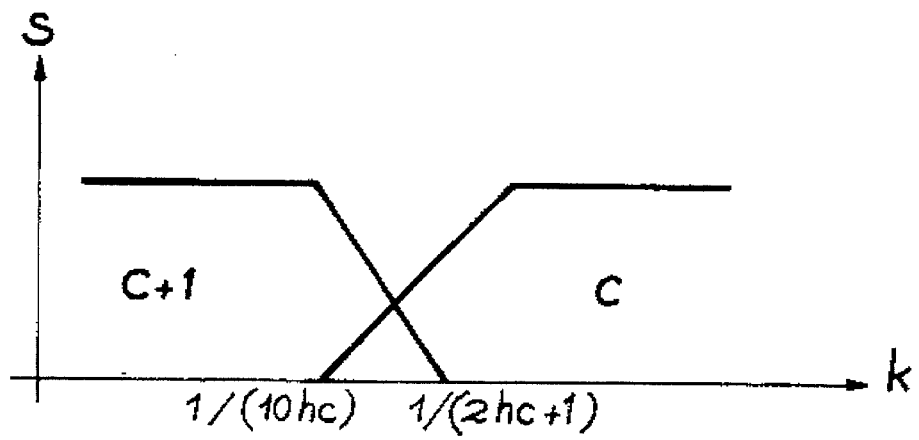
FIG. 4 Diagrammatically a spectrum coverage constraint usable in the invention.

FIG. 4 diagrammatically illustrates the overlap constraint of the spectra S making it necessary to have:

$$1/(10h_c) < 1/(2h_{c+1}) \text{ or: } h_{c+1} < 5h_c.$$

The equality of the ends of the spectra imposes that $h_{c+1} = 5h_c$. For a good overlap, it is possible to use a ratio $h_{c+1}/h_c$ of approximately 2 or 3.

The inversion stage will now be considered.

As the anomaly field generating model a choice has been made of a dipole distribution distributed in coherent manner with the water thickness and this applies at all points of the area to be mapped.

Therefore this model directly has the properties of constraining the measurements because it carries out an adaptive filtering in accordance with the space coordinates and in optimum manner, obeying Laplace's equation.

The inverse problem which it is necessary to solve is therefore that of finding magnetization densities having gradients of the anomaly field, so that by a simple, direct calculation it is possible to supply an estimate of the anomaly field everywhere in space.

The regularized extension operator is subdivided into two parts:

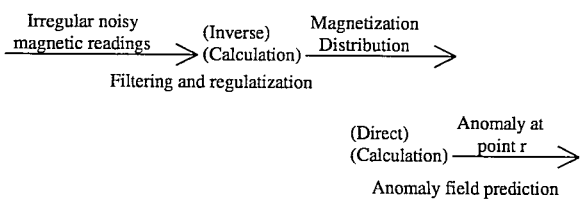

The geological field prediction system rejects everything which cannot be due to the local magnetic sources in a first stage and then directly calculates the prediction of the anomaly field at "point" r.

Thus, there has been an optimum filtering operator by inversion of the field data on a dipole model, followed by direct calculation.

An inversion method which can be advantageously used is described in the TARANTOLA 87 document and called stochastic inversion.

The regularization introduced by said method is a reminder of the solution towards an a prior given solution. Any other inverse method making it possible to calculate a dipole distribution can also be used.

This choice of stochastic inversion is appropriate for very numerous data (one problem can be 100,000 observations for 6,000 dipoles), because the calculation is vectorizable and falls within the scope of a large computer (such as e.g. the CRAY 2).

The field measurements are made noisy by the geomagnetic noise and a possible anisotropy of the measurement system.

It is possible to accurately reproduce the experimental process and/or the calculation process for obtaining gradients. This ensures that the model is close to reality.

Finally, stochastic inversion makes it possible to take account of the precision of the gradient data and at the output supplies the field with its precision.

One of the novel aspects of the method of determining the geological field at all points in space according to the invention is the easy use of geological field gradient data, which are less subject to the disturbing effects of magnetic noise.

The study of the theoretical properties of potential field gradients shows that there are relations between them and which can be used for limiting the data quantity necessary for the satisfactory reconstruction of the fields. These relations are given in the NELSON 88 document.

It is shown that merely knowing the vertical gradient $g_z$ on a planar surface makes it possible to recalculate all the other elements of the tensor of the gradients by 2D filtering relations.

As a function of the quantity and quality of the gradient data, it is therefore possible to invert the vertical gradient alone or two horizontal gradients, which would seem to be easier to measure in practice.

Two overdetermining sets of data (e.g. three gradients) can also be used. The chosen set of gradients determines, with the inversion method, a model of magnetization of the subsoil. On the basis of this magnetization distribution, by a direct simple procedure it is possible to recalculate its magnetic effect in field or gradient. This direct calculation can be carried out at any point in space, but is realistic for points located above the subsoil. In particular, it is possible to calculate the field on a plane, so as to produce the map of the anomaly field or its gradients.

It is also possible to predict the anomaly field at points located between the measurement points and the subsoil or above the measurement points.

These maps and predictions are accompanied by the precision of the estimate made, if the stochastic inversion method has been chosen.

The local and regional component recombination stage consists of adding field or gradient anomaly maps obtained in the preceding stage to regional gradient or field maps. The recombination consists of calculating the regional field maps with the aid of regional gradient maps. This can be carried out by integration of the regional gradient maps, if the two horizontal gradients are supplied.

If only the vertical regional gradient is supplied, an intermediate stage consists of finding the two horizontal gradients by using the relations given in the NELSON 88 document.

It is then possible to calculate the geological field map by adding the regional field component found to the field anomaly map.

The gradient maps of the total geological field are obtained by adding the regional gradient maps to those of the anomaly gradients determined by inversion and direct calculation for gradients taken in the same direction.

An embodiment will now be described of the measuring apparatus according to the invention for an ocean geological field mapping and with reference to FIG. 5. The apparatus of FIG. 5 comprises tight fish 10 containing magnetic field sensors, a boat (catamaran) 12 towing the fish, as well as two reference stations on land 16 and 18.

The sensor used must comply with a certain number of sensitivity and accuracy requirements, which are scarcely compatible with the movement of the boat and the difficult experimental conditions.

In addition, due to the data volume to be recorded the sensor handling facility is important. Under these conditions, the sensors used for survey purposes are magnetometers based on the nuclear magnetic resonance (NMR) principle and which are very suitable for track surveys (cf. the JACOB 87 document), whether theses surveys are in the ocean, space or air.

In order to avoid gyromagnetic effects, each measurement system must have a sufficiently low rotation speed to remain compatible with its sensor sensitivity.

Figure 5:
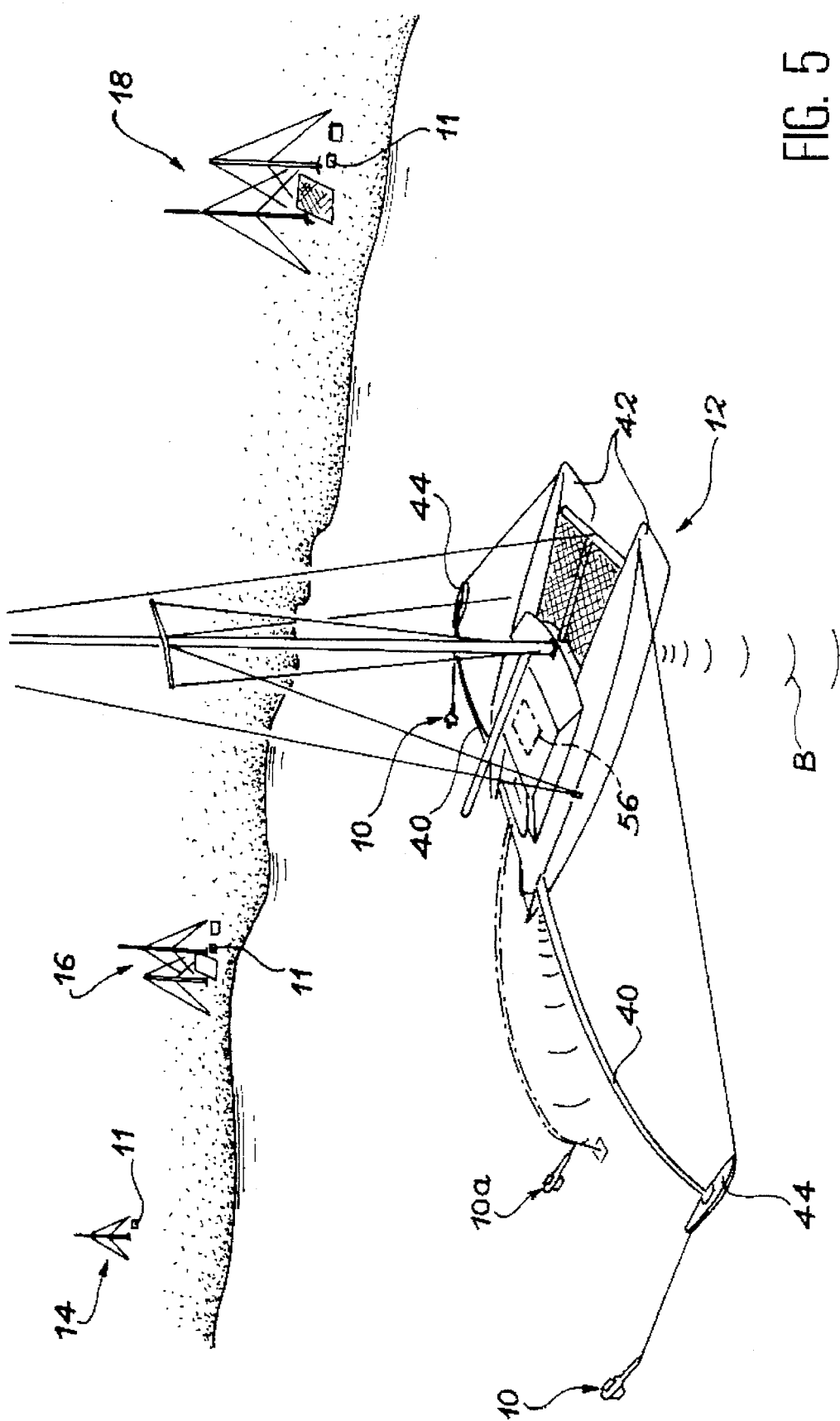
FIG. 5 A diagrammatic view of an embodiment of the apparatus according to the invention.

In the embodiment shown in FIG. 5, the sensors are placed on tight carrier fish able to withstand immersion depths of up to 150 m. They are towed by a relatively non-magnetic, 55 foot catamaran and are sufficiently remote therefrom to be free of its effects.

Figure 6:
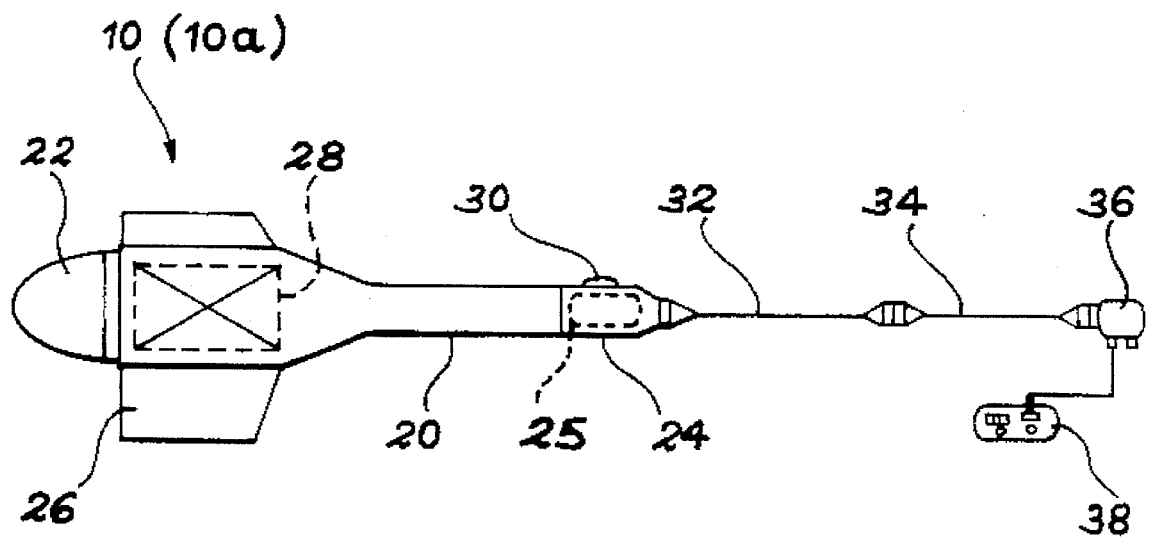
FIG. 6 A diagrammatic view of a "fish" carrying a magnetic sensor usable in the invention.

Other sensors are located on land at the two reference stations 16 and 18, whose data are continuously transmitted to the boat 12. A carrier fish 10 is diagrammatically shown in FIG. 6 and comprises an envelope 20, which is sealed by a rear plug 22 and a front plug 24 and which carries a fin or tail unit 26, as can be seen in FIG. 6. The corresponding NMR probe 28 is placed in the envelope 20, cf. FIG. 6.

The front plug 24 houses the electronics 25 associated with the probe 28 and forming therewith the sensor corresponding to the fish 10. A pressure sensor 30 is installed on the outer wall of the envelope 20.

The carrier fish is towed by means of an electric suspension cable 32, which is extended by an electric cable 34 terminated by a cable interface 36. FIG. 6 also shows an electric power supply 38 of the sensor 28.

The catamaran 12 has two booms 40, respectively fixed to its floats 42, as can be seen in FIG. 5.

With a view to having measured gradients free from geomagnetic noise, the catemaran tows at least two sensors at once, both being located in the same horizontal plane and separated by a distance compatible with the sea beds and on which information has been given hereinbefore. For practical reasons, the means has a fixed geometry and the distance between the sensors is fixed at 40 m.

The fish are located on either side of the boat at the respective ends of the booms, which are positioned port and starboard of the boat and whose ends ace equipped with floats 44, as shown in FIG. 5.

Therefore the fish fixed to the floats 44 are spaced from the catamaran by the length of the booms (14 m) and the length of the pulling cables attached to the floats 44.

The normalized difference between the port and starboard magnetometer signals makes it possible to obtain a measured horizontal gradient. A supplementary bed fish 10a is 3D positioned by means of a not shown acoustic system.

Figure 7:
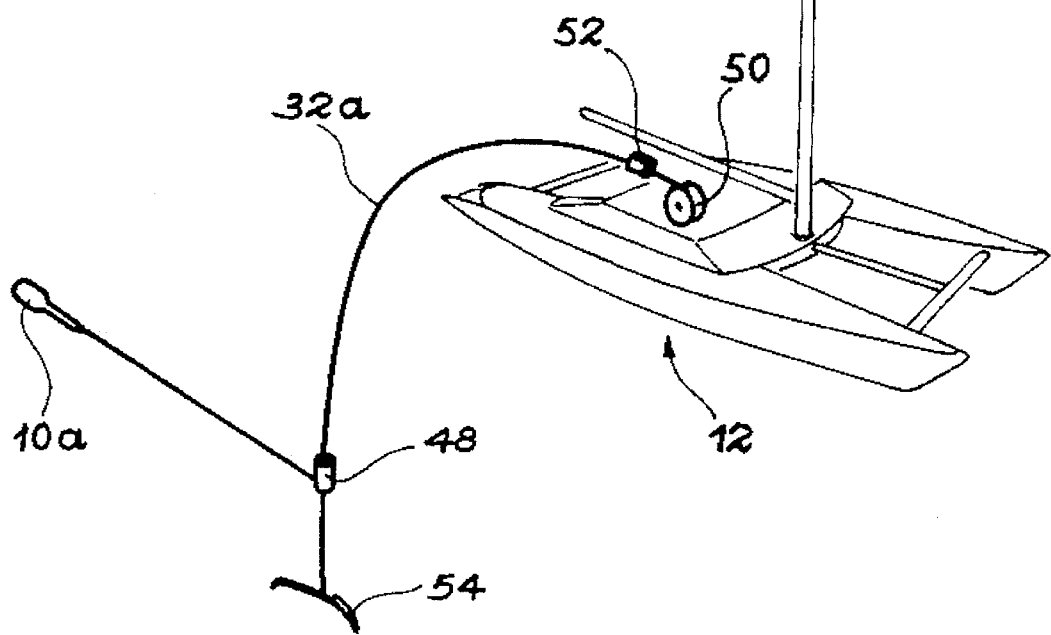
FIG. 7 The apparatus for producing a deeply submerged fish usable in the apparatus according to FIG. 5.

FIG. 7 shows the fish 10a connected to its electric towing cable 32a by an anchoring system 48.

The catamaran 12 carries a winch 50 making it possible to wind up the cable 32a and equipped with a tension sensor 52. The fish 10a is kept at a depth 50 m by a pressing-down device 54 connected to the anchoring system 48.

Apart from the two port and starboard surface fish 10 and the bed fish 10a, a fourth, not shown fish can be used on the surface.

The land references are constituted by sensors 11 identical to those towed by the boat and which are placed on the seashore at two sites occupied by the stations 16 and 18.

The catamaran 12 is also equipped with not shown means permitting the making of continuous bathymetric measurements (symbolized by the reference B in FIG. 5).

The catamaran 12 also has data processing means 56 permitting the processing of the field and position measurements in accordance with the process of the invention.

Positioning takes place with the SYLEDIS system using the propagation times of a signal between the boat and several land beacons. Another land station 14 has a SYLEDIS beacon and the stations 16 and 18 are NMR autonomous reference stations or ARS. The depth of the magnetic field sensors is given by the pressure sensors 30 accompanying them.

The precision reached after geometrical corrections and taking account of the fluctuations of the position of the fish around their mean trajectories is 5 meters for the probes east and west and 1 meter in depth. The catamaran 12 e.g. travels at a speed of 5 knots (4.6 m/s).

The boat trajectories have parallel straight portions (profiles) and the spacing between these profiles respects the aforementioned density rule.

The signal sampling speed is 2 Hz, which generates a field datum every 0.5 seconds, namely a space sampling of a few meters along a profile.

Thus, an apparatus for producing a geological field map of an area to be mapped may include a group of magnetic field sensors, each of the sensors having probes 28, the sensors supplying signals corresponding to an earth magnetic field. The apparatus further includes a device, preferably including a catamaran 12, for simultaneously displacing the sensors over the area to be mapped such that positions of the probes of the sensors as a function of time are known. Processing means including a computer 56 is provided, the computer being programmable to preprocess data including the earth magnetic field measurements and positions of the sensors over time by low-pass filtering of the data to yield preprocessed earth magnetic field measurement data, obtain a gradient map from at least one of a first and a second group of gradients, the first group of gradients being determined from a difference between two preprocessed earth magnetic field measurement data corresponding to earth magnetic field measurements obtained by two different ones of the sensors at the same time and including gradients of a local field and gradients of a regional field. The computer is also programmable to obtain, by inversion and direct calculation using the gradients of the local field a local field gradient map of an anomaly field of the area to be mapped, and, by integrating the regional field gradients, a regional field gradient map, to calculate magnetization distribution and determine, with the magnetization distribution, based on a magnetization distribution model of subsoil of the area to be mapped, at least one of the anomaly field and gradients of the anomaly field, in the form of at least one of] a field [and gradients of the field, determine at least one of a regional field and gradients of the regional field based on the regional field gradient map, and determine at least one of a geological field map, by addition of the field corresponding to the anomaly field and the regional field, and a geological field gradient map, by addition of the gradients of the anomaly field and the gradients of the regional field. The device for simultaneous displacement simultaneously displaces the sensors such that a sufficient clearance between the probes is provided to avoid deterioration of information corresponding to the gradients determined from the difference between the two preprocessed earth magnetic field measurement data corresponding to the earth magnetic field measurements obtained by the two different ones of the sensors at the same time during the production of the gradients.

Figure 8:
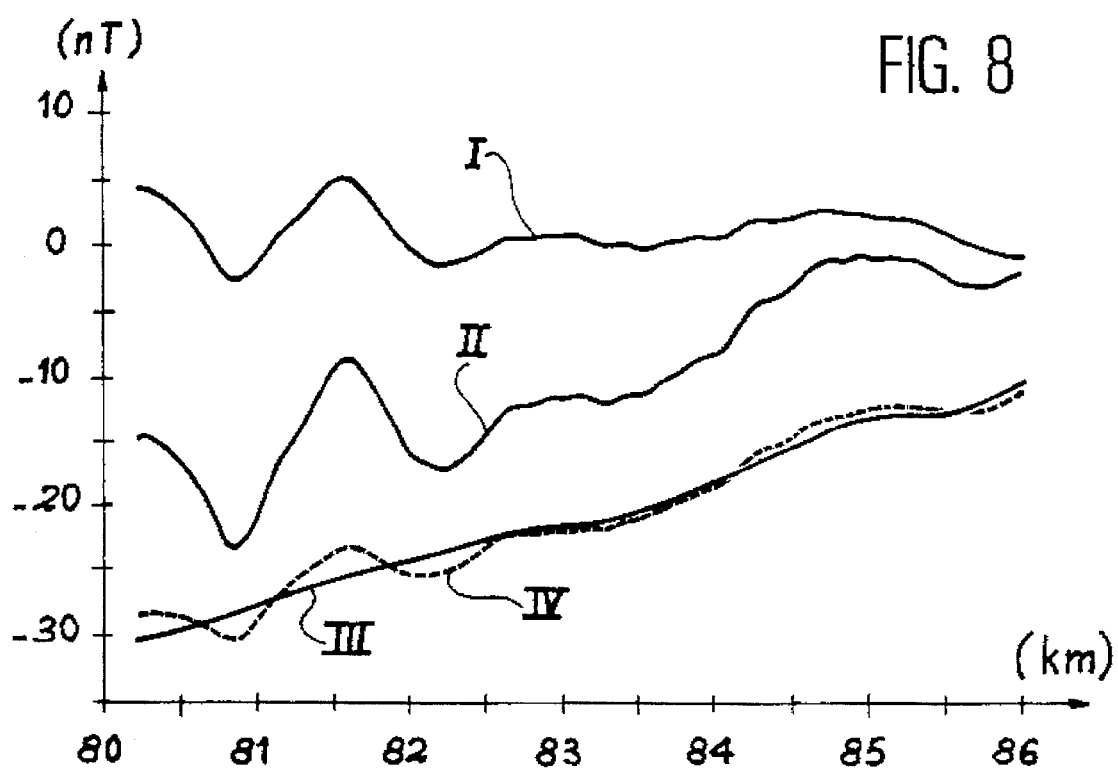
FIG. 8 Geomagnetic signals recorded on land (I), at sea (II) and signals relative to the geology obtained according to the invention (III) or a conventional method (IV).

FIG. 8 shows a south-north profile clearly showing the complexity of the phenomena.

The geomagnetic signals recorded on land (curve I) and in the ocean (curve II) are shown, together with the geological field signals obtained by the direct calculation and inversion method (curve III) and by conventional reduction (curve IV). This conventional reduction consists of forming the difference between the measurements of the magnetometers and a land reference.

The movement along the profile is counted on the abscissa axis and the modulus of the field on the ordinate axis.

It can be seen that geomagnetic pulsations on land are amplified for the profile start frequency by a factor of approximately 1.45 compared with recordings performed at sea.

The geological profile reconstructed by differentiation shows considerable geomagnetic noise residues (3 to 10 nT) incompatible with the desired 0.1 nT.

The geology signal is subject to variations of approximately 1 nT around a general south-north tendency of 3 nT/km due to the gradient of the Gaussian field.

These findings show that the known method of merely subtracting a land-recorded noise reference is not very reliable with regards to the accuracy obtained. On conclusion, the land-sea filter is far from an identity filter.

The present invention, which uses gradient methods, does not suffer from these disadvantages.

The multiprofile apparatus used in the invention makes it possible to obtain measured gradients and which therefore for the desired accuracy are free from geomagnetic noise, but are potentially noise-prone due to the anisotropy of the measuring system.

The profiles made in north-south and east-west directions produce north and east measured gradients, which are sufficiently theoretical for the reconstruction of a field map. The geometry of the measuring system imposes a base length of 40 m for forming the difference, which ensures a perfect reduction for the geomagnetic noise.

However, for geological signals only having gradients of a few nT/km or pT/m, the difference of the signals between two sensors only reaches a few pT.

If the anisotropy envisaged by each sensor is equal to 10 pT, without considering the other error sources, there is an error of 0.5 pT/m for the measured gradients.

The gradients calculated by the derivation of the field profiles previously reduced in the best possible way make it possible to obtain data, whose noise level (geomagnetic noise residues) is regulatable in accordance with the derivative filter used and for which the anisotropy is zero if the course of the boat is constant. The base length used is 250 m.

This distance is a comprise between the resolution of the maps and their noise level. A short base length permit a significant resolution, which is desirable for small depths where the geological signals are liable to have the highest frequencies. A large base length makes it possible to obtain a significant averaging effect and thus reduce the geomagnetic noise.

The calculated gradients obtained by differentiation of the field profiles make it possible to complete the set of measured gradients.

The dipole distribution is obtained from the discretization of the subsoil and the distribution of the dipoles is brought about by taking as constraints the rules given hereinbefore.

The total dipole distribution is constituted by the sum of a distribution formed from dipoles placed on the sea bed and a distribution brought about by constant depth layers.

The gradients of the anomaly field are obtained after subtraction of the regional component assumed to be constant for the gradients. The measured gradient data are firstly inverted to permit the calculation of a Wiener filter.

The particular advantages obtained by the invention are as follows. The invention leads to freedom from geomagnetic noise, no matter what its amplitude, which can be very significant during periods of magnetic storms and high solar activity without land or marine reference stations. It also makes it possible to solve the problem of the downward extension of the field by using a robust method carrying out an adaptive prefiltering in accordance with the space coordinates.

The geological field maps are obtained at random altitudes and/or the values of the geological field can be calculated at random points in space. The measurement profiles can be produced according to random trajectories of the mobile acquisition apparatus in the case where the measuring system is isotropic.

These measurements can be of different types (fields or gradients) and obtained simultaneously with the aid of several moving objects moving over the area to be explored. The measurement directions of the different gradients can be of a random nature and can evolve during the displacement of the acquisition apparatus.

The invention permits both an upward and downward extension, as well as an optimum interpolation of the measurements in accordance with a regular or irregular meshing of 1, 2 or 3 dimensions. These filtering, interpolation and extension operations respect the constraint of a potential field, namely the Laplacian derivative of the field is zero.

The present description has referred to the following documents:

(BLAINPAIN 79) R. Blanpain: "Traitement en temps réel du signal issu d'une sonde magnétométrique pour la détection d'anomalis magnétiques", INPG Thesis, 1979.

(CHAVE 90) A. D. Chave, J. R. Booker, C. S. Cox, P. L. Gruber, L. W. Hart, H. F. Morrison, J. G. Heacock, D. Johnson: "Report of a workshop on the geoelectric and geomagnetic environment of Continental Margins", Marine Physical Lab., Univ. of California, San Diego, 1990.

(JACOBS 89) J. A. Jacobs (Ed.): "Geomagnetism", Edited by J. A. Jacobs, Academic Press, 1989.

(GRANT 65) F. S. Grant, G. F. West: "Interpretation Theory in Applied Geophysics", MacGraw Hill Book Company, 1965.

(NELSON 88) J. B. Nelson: "Calculation of the magnetic gradient tensor from field gradient measurements and its application to geophysical interpretation", Geophysics, vol. 53, No. 7, July 1988.

(MILLER 77) S. P. Miller: "The validity of the geological interpretations of marine magnetic anomalies", Geophys. J. R. Soc., 50, 1977.

(PARKER 72) R. L. Parker: "Magnetic upward continuation from an uneven track", Geophysics, vol. 37, No. 4, August 1972.

(CARESS 89) D. W. Caress, R. L. Parker: "Spectral Interpolation and Downward Continuation of Marine Magnetic Anomaly Data", J. Geophys. Res., vol. 94, No. B12, Dec. 10 1989.

(TARANTOLA 87) A. Tarantola: "Inverse Problem Theory, Methods for Data Fitting and Model Parameter Estimation", Elservier Science Publishers B. V., 1988.

(ZHDANOV 84) M. S. Zhdanov: "Integral Transform in Geophysics", Springer Verlag, 1984.

(BERDICHEVSKY 84) M. N. Berdichevski, M. S. Zhdanov: "Advanced Theory of deep Magnetic Sounding", Elsevier Science Publishers B. V., 1984.

(BAUDOIS 89) D. Baudois, C. Serviere, A. Silvent: "Soustraction de bruit, Analyse et synthèse bibliographique", Traitement du Signal, vol. 6, No. 5, 1989.

(LE (QUENTREC 91) M. F. Le Quentrec, B. Sichler: "3D Inversion of deep tow magnetic data on the Atlantis II deep (Red-Sea): hydrothermal and geodyamic interpretation; Tectonophysics, 198, (1991), pp 421–439, 1991.

(RICHARD 84) V. Richard, R. Bayer, M. Cuer: "An attempt to formulate well-posed questions gravity. Application of Linear Inverse Techniques to mining exploration", Geophysics, vol. 49, No. 10, October 1984.

(LANGEL 92) International geomagnetic reference field 1991, Revision, Geophysics, vol. 57, No. 7, July 1992.

We claim:

1. Process for producing a map of a geological field at any point of an area to be mapped, comprising the steps of:

moving two or more magnetic field sensors over the area to be mapped in accordance with predetermined trajectories;

measuring an earth magnetic field of the area to be mapped with the two or more sensors and obtaining earth magnetic field measurements;

preprocessing data including the earth magnetic field measurements and positions of the two or more sensors over time, the preprocessing including low-pass filtering of the data,
    preprocessing of the data yielding preprocessed earth magnetic field measurement data;

obtaining a gradient map from a group of gradients, the group of gradients being determined from a difference between two preprocessed earth magnetic field measurement data corresponding to earth magnetic field measurements obtained by two different ones of the two or more sensors at the same time;

breaking down the obtained gradient map into a local field gradient map of an anomaly field of the area to be mapped, and a regional field gradient map;

choosing a magnetization distribution model of subsoil of the area to be mapped and calculating magnetization distribution and determining, with the magnetization distribution, at least one of the anomaly field and gradients of the anomaly field, in the form of at least one of a field and gradients of the field;

determining a regional field based on the regional field gradient map; and determining a geological field map by addition of the field corresponding to the anomaly field and the regional field.

2. Process according to claim 1, wherein the preprocessed earth magnetic field measurement data corresponds to a given course trajectory and includes a field measurement and a position of the probe of each of the two or more sensors at a corresponding measurement time.

3. Process according to claim 1, comprising the further step of elimination of geomagnetic noise from the earth magnetic field measurements by subtracting an estimate of geomagnetic noise from the earth magnetic field measurements prior to determining the group of gradients from preprocessed earth magnetic field measurements.

4. Process according to claim 1, wherein a stochastic inversion is used for the calculation of the magnetization distribution.

5. Process according to claim 1, wherein the chosen magnetization distribution is of a dipole type, magnetic dipoles being in the subsoil, and the magnetization distribution extending over an area including the area to be mapped.

6. Process according to claim 5, wherein a curve of variations of the regional field as a function of horizontal space coordinates adopts a shape of a ramp, wherein a maximum depth of a distribution of dipoles is equal to $1/10$ of a maximum dimension of a map to be made, wherein a distance between dipoles located at a given depth is at most equal to half the given depth and wherein dipoles are distributed in layers of increasing depths, each layer being located at a depth at the most equal to five times a depth of a preceding layer.

7. Apparatus for producing a geological field map of an area to be mapped, comprising:

a group of magnetic field sensors, each of the sensors having probes, the sensors supplying signals corresponding to an earth magnetic field;

means for simultaneously displacing the sensors over the area to be mapped such that positions of the probes of the sensors as a function of time are known;

a computer, the computer being programmable to
    preprocess data including the earth magnetic field measurements and positions of the sensors over time by low-pass filtering of the data to yield preprocessed earth magnetic field measurement data, obtain a gradient map from a group of gradients, the group of gradients being determined from a difference between two preprocessed earth magnetic field measurement data corresponding to earth magnetic field measurements obtained by two different ones of the sensors at the same time and including gradients of a local field and gradients of a regional field, obtain, by inversion and direct calculation using the gradients of the local field a local field gradient map of an anomaly field of the area to be mapped, and, by integrating the regional field gradients, a regional field gradient map, calculate magnetization distribution and determine, with the magnetization distribution, based on a magnetization distribution model of subsoil of the area to be mapped, the anomaly field in the form of a field, determine a regional field based on the regional field gradient map, and determine a geological field map, by addition of the field corresponding to the anomaly field and the regional field map, by addition of the gradients of the anomaly field and the gradients of the regional; and the simultaneous displacement means simultaneously displacing the sensors such that a sufficient clearance between the probes is provided to avoid deterioration of information corresponding to the gradients determined from the difference between the two preprocessed earth magnetic field measurement data corresponding to the earth magnetic field measurements obtained by the two different ones of the sensors at the same time during the production of the gradients.

8. Apparatus according to claim 7, wherein the simultaneous displacing means maintains a spacing between the probes as the probes are moved in a horizontal plane at a determined distance from local magnetic sources, the spacing being at most equal to a smaller of the determined distance and a maximum spacing of the probes wherein the probes are able to have a same electrical conductivity environment for a given accuracy.

9. Apparatus according to claim 7, wherein the sensors are nuclear magnetic resonance sensors.

10. Process for producing a map of a geological field at any point of an area to be mapped, comprising the steps of:

moving one or more magnetic field sensors over the area to be mapped in accordance with predetermined trajectories;

measuring an earth magnetic field of the area to be mapped with the one or more sensors and obtaining earth magnetic field measurements;

preprocessing data including the earth magnetic field measurements and positions of the one or more sensors over time, the preprocessing including
low-pass filtering of the data,
preprocessing of the data yielding preprocessed earth magnetic field measurement data;

obtaining a gradient map from a group of gradients, the group of gradients being determined frown a difference between two preprocessed earth magnetic field measurement data corresponding to earth magnetic field measurements obtained by a single one of the one or more sensors at two different times;

breaking down the obtained gradient map into a local field gradient map of an anomaly field of the area to be mapped, and a regional field gradient map;

choosing a magnetization distribution model of subsoil of the area to be mapped and calculating magnetization distribution and determining, with the magnetization distribution, at least one of the anomaly field and gradients of the anomaly field, in the form of at least one of a field and gradients of the field;

determining a regional field based on the regional field gradient map; and determining a geological field map by addition of the field corresponding to the anomaly field and the regional field.

11. Process according to claim 10, wherein the preprocessed earth magnetic field measurement data corresponds to a given course trajectory and includes a field measurement and a position of the probe of each of the one or more sensors at a corresponding measurement time.

12. Process according to claim 10, comprising the further step of elimination of geomagnetic noise from the earth magnetic field measurements by subtracting an estimate of geomagnetic noise from the earth magnetic field measurements prior to determining the group of gradients from preprocessed earth magnetic field measurements.

13. Process according to claim 10, wherein a stochastic inversion is used for the calculation of the magnetization distribution.

14. Process according to claim 10, wherein the chosen magnetization distribution is of a dipole type, magnetic dipoles being in the subsoil, and the magnetization distribution extending over an area including the area to be mapped.

15. Process according to claim 14, wherein a curve of variations of the regional field as a function of horizontal space coordinates adopts a shape of a ramp, wherein a maximum depth of a distribution of dipoles is equal to $\frac{1}{10}$ of a maximum dimension of a map to be made, wherein a distance between dipoles located at a given depth is at most equal to half the given depth and wherein dipoles are distributed in layers of increasing depths, each layer being located at a depth at the most equal to five times a depth of a preceding layer.

16. Process for producing a map of a geological field at any point of an area to be mapped, comprising the steps of:

moving two or more magnetic field sensors over the area to be mapped in accordance with predetermined trajectories;

measuring an earth magnetic field of the area to be mapped with the two or more sensors and obtaining earth magnetic field measurements;

preprocessing data including the earth magnetic field measurements and positions of the two or more sensors over time, the preprocessing including
low-pass filtering of the data,
preprocessing of the data yielding preprocessed earth magnetic field measurement data;

obtaining a gradient map from a group of gradients, the group of gradients being determined from a difference between two preprocessed earth magnetic field measurement data corresponding to earth magnetic field measurements obtained by two different ones of the two or more sensors at the same time;

breaking down the obtained gradient map into a local field gradient map of an anomaly field of the area to be mapped, and a regional field gradient map;

choosing a magnetization distribution model of subsoil of the area to be mapped and calculating magnetization distribution and determining, with the magnetization distribution, at least one of the anomaly field and gradients of the anomaly field, in the form of at least one of a field and gradients of the field;

determining gradients of the regional field based on the regional field gradient map; and determining a geological field gradient map by addition of the gradients of the anomaly field and the gradients of the regional field.

17. Process according to claim 16, wherein the preprocessed earth magnetic field measurement data corresponds to a given course trajectory and includes a field measurement and a position of the probe of each of the two or more sensors at a corresponding measurement time.

18. Process according to claim 16, comprising the further step of elimination of geomagnetic noise from the earth magnetic field measurements by subtracting an estimate of geomagnetic noise from the earth magnetic field measurements prior to determining the group of gradients from preprocessed earth magnetic field measurements.

19. Process according to claim 16, wherein a stochastic inversion is used for the calculation of the magnetization distribution.

20. Process according to claim 16, wherein the chosen magnetization distribution is of a dipole type, magnetic dipoles being in the subsoil, and the magnetization distribution extending over an area including the area to be mapped.

21. Process according to claim 20, wherein a curve of variations of the regional field as a function of horizontal space coordinates adopts a shape of a ramp, wherein a maximum depth of a distribution of dipoles is equal to 1/10 of a maximum dimension of a map to be made, wherein a distance between dipoles located at a given depth is at most equal to half the given depth and wherein dipoles are distributed in layers of increasing depths, each layer being located at a depth at the most equal to five times a depth of a preceding layer.

22. Process for producing a map of a geological field at any point of an area to be mapped, comprising the steps of:

moving one or more magnetic field sensors over the area to be mapped in accordance with predetermined trajectories;

measuring an earth magnetic field of the area to be mapped with the one or more sensors and obtaining earth magnetic field measurements;

preprocessing data including the earth magnetic field measurements and positions of the one or more sensors over time, the preprocessing including
    low-pass filtering of the data,
    preprocessing of the data yielding preprocessed earth magnetic field measurement data;

obtaining a gradient map from a group of gradients, the group of gradients being determined from a difference between two preprocessed earth magnetic field measurement data corresponding to earth magnetic field measurements obtained by a single one of the one or more sensors at two different times;

breaking down the obtained gradient map into a local field gradient map of an anomaly field of the area to be mapped, and a regional field gradient map;

choosing a magnetization distribution model of subsoil of the area to be mapped and calculating magnetization distribution and determining, with the magnetization distribution, at least one of the anomaly field and gradients of the anomaly field, in the form of at least one of a field and gradients of the field;

determining gradients of the regional field based on the regional field gradient map; and determining a geological field gradient map by addition of the gradients of the anomaly field and the gradients of the regional field.

23. Process according to claim 22, wherein the preprocessed earth magnetic field measurement data corresponds to a given course trajectory and includes a field measurement and a position of the probe of each of the one or more sensors at a corresponding measurement time.

24. Process according to claim 22, comprising the further step of elimination of geomagnetic noise from the earth magnetic field measurements by subtracting an estimate of geomagnetic noise from the earth magnetic field measurements prior to determining the group of gradients from preprocessed earth magnetic field measurements.

25. Process according to claim 22, wherein a stochastic inversion is used for the calculation of the magnetization distribution.

26. Process according to claim 22, wherein the chosen magnetization distribution is of a dipole type, magnetic dipoles being in the subsoil, and the magnetization distribution extending over an area including the area to be mapped.

27. Process according to claim 26, wherein a curve of variations of the regional field as a function of horizontal space coordinates adopts a shape of a ramp, wherein a maximum depth of a distribution of dipoles is equal to 1/10 of a maximum dimension of a map to be made, wherein a distance between dipoles located at a given depth is at most equal to half the given depth and wherein dipoles are distributed in layers of increasing depths, each layer being located at a depth at the most equal to five times a depth of a preceding layer.

28. Apparatus for producing a geological field map of an area to be mapped, comprising:

a group of magnetic field sensors, each of the sensors having probes, the sensors supplying signals corresponding to an earth magnetic field;

means for simultaneously displacing the sensors over the area to be mapped such that positions of the probes of the sensors as a function of time are known;

a computer, the computer being programmable to
    preprocess data including the earth magnetic field measurements and positions of the sensors over time by low-pass filtering of the data to yield preprocessed earth magnetic field measurement data, obtain a gradient map from a group of gradients, the group of gradients being determined from a difference between two preprocessed earth magnetic field measurement data corresponding to earth magnetic field measurements obtained by two different ones of the sensors at the same time and including gradients of a local field and gradients of a regional field, obtain, by inversion and direct calculation using the gradients of the local field a local field gradient map of an anomaly field of the area to be mapped, and, by integrating the regional field gradients, a regional field gradient map, calculate magnetization distribution and determine, with the magnetization distribution, based on a magnetization distribution model of subsoil of the area to be mapped, gradients of the anomaly field, in the form of gradients of the field, determine gradients of the regional field based on the regional field gradient map, and determine a geological field gradient map, by addition of the gradients of the anomaly field and the gradients of the regional field; and the simultaneous displacement means simultaneously displacing the sensors such that a sufficient clearance between the probes is provided to avoid deterioration of information corresponding to the gradients determined from the difference between the two preprocessed earth magnetic field measurement data corresponding to the earth magnetic field measurements obtained by the two different ones of the sensors at the same time during the production of the gradients.

29. Apparatus according to claim 28, wherein the simultaneous displacing means maintains a spacing between the probes as the probes are moved in a horizontal plane at a determined distance from local magnetic sources, the spacing being at most equal to a smaller of the determined distance and a maximum spacing of the probes wherein the probes are able to have a same electrical conductivity environment for a given accuracy.

30. Apparatus according to claim 28, wherein the sensors are nuclear magnetic resonance sensors.

\* \* \* \* \*